United States Patent [19]

Pejouhy

[11] Patent Number: 4,536,817

[45] Date of Patent: Aug. 20, 1985

[54] RECESSED LIGHTING FIXTURE AND AN INSULATION DETECTING PROTECTOR DEVICE THEREFOR

[75] Inventor: Radi Pejouhy, Marshfield, Mass.

[73] Assignee: Texas Instruments Incorporated, Dallas, Tex.

[21] Appl. No.: 473,848

[22] Filed: Mar. 10, 1983

[51] Int. Cl.[3] .............................................. H02H 5/04

[52] U.S. Cl. .................................................. 361/105

[58] Field of Search ............... 361/105, 104, 103, 106; 337/102

[56] References Cited

U.S. PATENT DOCUMENTS

| | | | |
|---|---|---|---|
| 2,312,915 | 2/1948 | Kurtz | 361/105 |
| 4,224,591 | 9/1980 | Senor | 337/102 |
| 4,241,370 | 12/1980 | DeFilippis et al. | 361/24 |
| 4,334,209 | 6/1982 | Dennis | 337/102 |
| 4,388,677 | 6/1983 | Druffel | 361/105 |

FOREIGN PATENT DOCUMENTS 628567 8/1949 United Kingdom .

*Primary Examiner*—A. D. Pellinen
*Assistant Examiner*—Hong K. Choe
*Attorney, Agent, or Firm*—James P. McAndrews; John A. Haug; Melvin Sharp

[57] ABSTRACT

An electrical lighting fixture adapted for recessed mounting has structure for mounting and energizing a lamp and has an insulation detecting protector device adapted to interrupt operation of the lamp to prevent overheating of the fixture if thermal insulation is disposed around the fixture in such a way as to excessively block heat dissipation from the fixture. The protector device has structure for mounting the device on the fixture to be subject to representative fixture conditions, has a thermally responsive switch which is actuatable in response to heating to a selected temperature for interrupting operation of the lamp, and has an electrical resistance heater which is thermally coupled to the switch for actuating the switch if thermal insulation excessively blocks dissipation of heat from the protector device. Thermal barrier elements are incorporated in the leads which connect the switch and heater to a power source and to the lamp and limit heat-transfer out of the protector device via the leads to a minor proportion of the heat output of the heater, thereby to permit operation of the heater at a low power level while assuring that the protector device prevents overheating of the fixture and avoids nuisance interruption of the lamp even during anticipated levels of variation in line voltage and ambient temperature.

7 Claims, 8 Drawing Figures

RECESSED LIGHTING FIXTURE AND AN INSULATION DETECTING PROTECTOR DEVICE THEREFOR

BACKGROUND OF THE INVENTION

The field of this invention is that of thermally protected electrical lighting fixtures and the invention relates more particularly to recessed lighting fixtures having means which detect the presence of thermal insulation excessively blocking dissipation of heat from the recessed fixture to interrupt operation of the lamp in the fixture to prevent overheating of the fixture.

Electrical lighting fixtures to be mounted in recessed locations are typically rated to operate at selected power levels to avoid excessive build-up of heat in the recessed lamp mounting locations. The fixture ratings are determined in anticipation that the fixture will be substantially free of surrounding thermal insulation in its recessed location but, to avoid risk of overheating, thermally responsive protector means are also used to interrupt lamp operation if fixture overheating should tend to occur. In one known system, an insulation detecting type of protector device is mounted on the fixture in such a location that thermal insulation which tends to block dissipation of heat from the fixture is also adapted to block dissipation of heat from the protector. The protector device includes a thermally responsive electrical switch which is arranged in series with the fixture lamp and which is adapted to be actuated in response to heating to a selected temperature for interrupting operation of the lamp. The protector also includes an electrical resistance heater which is connected in parallel with the lamp and which is thermally coupled to the switch means. In that arrangement, the protector device is intended to normally dissipate the heat output of the heater without actuating the switch if thermal insulation surrounding the fixture does not excessively block dissipation of heat from the fixture and from the protector device. However, if thermal insulation does excessively block heat dissipation from the fixture and protector so that the fixture would tend to overheat, the heat output from the heater actuates the switch to interrupt lamp operation and prevent such overheating. However it is found that known insulation detecting types of protector devices used in recessed lighting fixtures are likely to cause excessive nuisance interruptions in lamp operation or to permit occasional operation of the fixtures at higher temperatures than would be desired. Further, it is found that, to obtain suitable operation of such protector devices, devices frequently need to be operated at relatively high power levels which add to lighting costs and further risk development of unnecessarily high heater temperatures.

It is now found that the presence of thermal insulation surrounding a recessed lighting fixture tends to cause overheating of the fixture in large part because the thermal insulation prevents the dissipation of heat by convection around the fixture. However it is found that the dissipation of heat from the known protector devices used in such recessed lighting fixtures is due to an excessive extent to conduction of heat out of the protector via the electrical leads which are used in connecting the protector heater and switch means in the lighting circuit. That is, a significant proportion of the heat output from the heater used in such known protector devices is transferred out of the devices by heat conduction along the heater and switch leads used in a protector device. In that situation, variation in the amount of thermal insulation surrounding conventional recessed lighting fixtures tends to vary fixture temperature more readily than the temperature of the switch means used in the protector device incorporated in the fixture. As a result it is found that known protector devices tend to require precise matching to the fixtures to achieve even minimal protection against fixture overheating and, even with such precise matching, are likely to result in excessive nuisance interruption of lamp operation in the fixtures during normal variation in line voltages and ambient temperatures. Frequently the protector devices used in known recessed lighting fixtures have required operation at excessively high power levels in order to achieve even marginal performance characteristics and such higher heater power levels increase lighting costs and further risk development of unnecessarily high heater temperatures.

SUMMARY OF THE INVENTION

It is an object of this invention to provide a novel and improved electrical lighting fixture; to provide such an improved fixture which is particularly adapted for recessed mounting; to provide such an improved recessed lighting fixture which incorporates improved insulation detecting protector means for interrupting operation of lamp means in the fixture to prevent overheating of the fixture if thermal insulation excessively blocks dissipation of heat from the fixture; to provide such a protector means which achieves safe and reliable lamp operation in a recessed lighting fixture free of risk of fixture overheating and free of nuisance interruption of lamp operation; to provide such an improved protector means which operates at low power levels to assure proper and reliable lamp operation in a recessed lighting fixture even during anticipated variations in line voltage and ambient temperatures; to provide such a protector means having self-regulating electrical resistance heater means; and to provide such an improved protector means which is of simple, rugged, reliable and inexpensive construction.

Briefly described, the novel and improved electrical lighting fixture of this invention includes means for mounting and energizing lamp means, and insulation detecting protector means mounted on the fixture for interrupting operation of the lamp means to prevent overheating of the fixture if thermal insulation excessively blocks dissipation of heat from the fixture. The protector means comprises thermally responsive electrical switch means having lead means for electrically connecting the switch means in a circuit in series relation to the lamp, the switch means being actuatable in response to heating to a selected temperature for interrupting operation of the lamp means. The protector means also incorporates electrical resistance heater means having electrical lead means for electrically connecting the heater means in a circuit in parallel relation to the lamp means, the heater means being thermally coupled to the switch means for actuating the switch means if thermal insulation excessively blocks dissipation of heat from the protector means. In accordance with this invention, the electrical lead means are arranged to limit heat-transfer from the protector device through the lead means to an insignificant proportion of the heat output of the heater means. In that way, heating of the switch means by the heater means is enhanced in the presence of thermal insulation surrounding the protector device to achieve safe, reliable operation of the lighting fixture free of nuisance interruption of the lamp means. In accordance with this invention, the lead means incorporate thermal barrier elements of relatively high thermal resistivity, the barrier elements preferably being formed of stainless steels or chrome-nickel alloys or the like having high thermal resistivities $R_T$ of at least 10 seconds per centimeter/°C./Calorie. Those thermal barrier lead elements are then electrically connected in series with other lead elements of copper wire or the like having relatively high electrical conductivity for connecting the thermally responsive switch means and electrical resistance heater means of the protector device in an electrical circuit. Preferably the switch means and heater means are enclosed in an open-ended housing having said thermal barrier elements mounted in the open end of the housing. In that way, the lighting fixture is particularly adapted for recessed mounting and provides improved, reliable protection of the lighting fixture against overheating if thermal insulation excessively blocks dissipation of heat from the fixture. The protector device is operable at low power levels and is free of nuisance interruption of the lamp means in the fixture even during variations in line voltage and ambient temperature which are likely to be encounterd. The protector device is also simple, rugged, reliable and inexpensive construction.

DESCRIPTION OF THE DRAWINGS

Other objects, advantages and details of the novel and improved lighting fixture and protector device of this invention appear in the following detailed description of preferred embodiments of the invention, the detailed description referring to the drawings in which.

DESCRIPTION OF PREFERRED EMBODIMENTS

Figure 1:
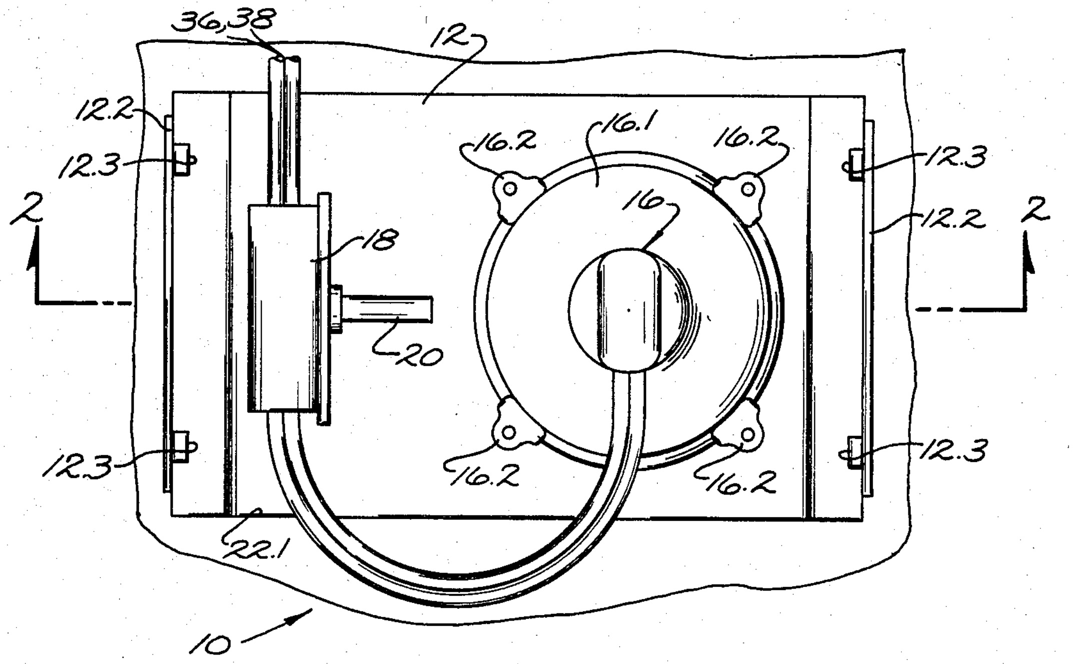
FIG. 1 is a plan view illustrating mounting of a recessed lighting fixture according to this invention in a recessed mounting location.
Figure 2:
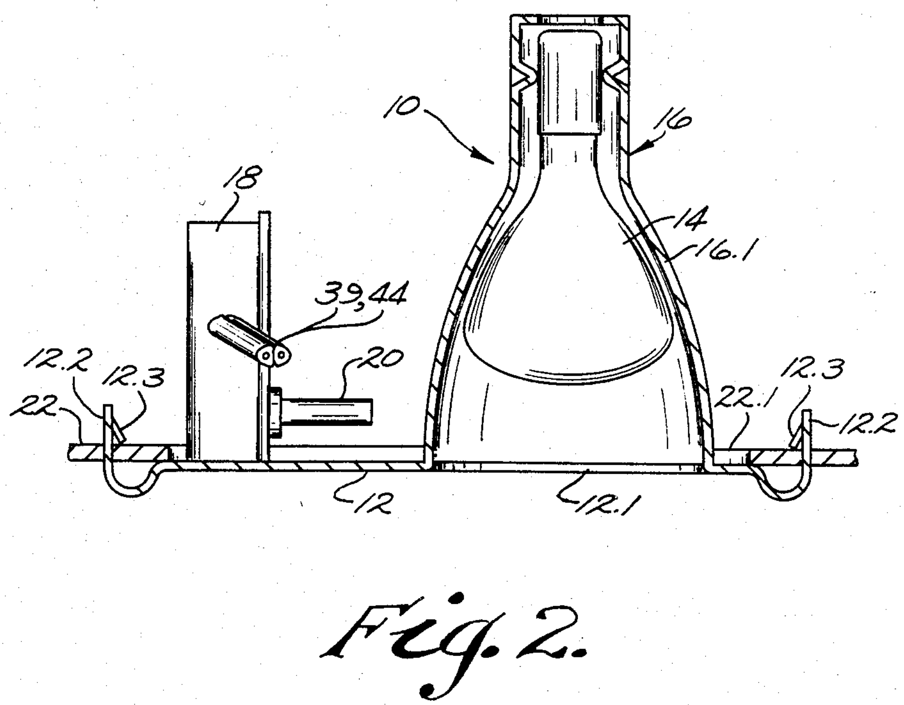
FIG. 2 is a section view along line 2—2 of FIG. 1.
Figure 3:
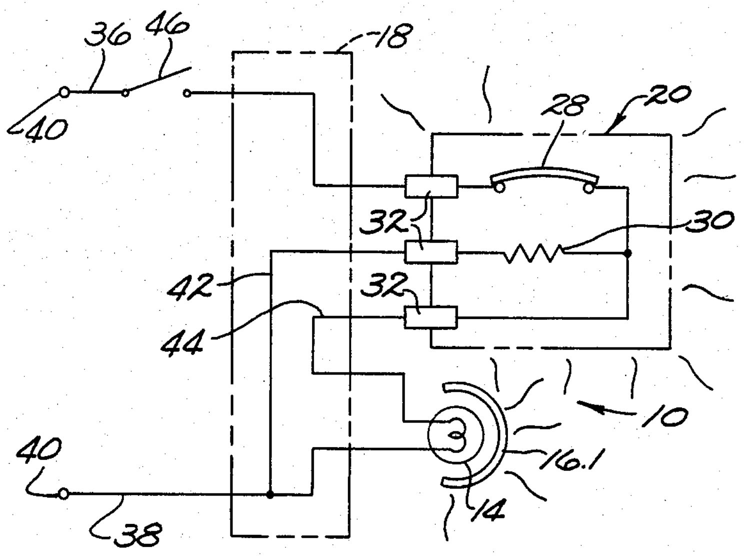
FIG. 3 is a schematic view of the lighting fixture of this invention.

Referring to the drawings, 10 in FIGS. 1–3 indicates the novel and improved recessed lighting fixture of this invention which is shown to include a base plate 12 having an opening 12.1 and preferably having upturned flanges 12.2 at two ends of the plate. A conventional lamp 14 is mounted within a lamp mounting means 16. The lamp mounting means preferably has a reflector portion 16.1 and brackets 16.2 are arranged to secure the mounting means to the plate over the plate opening 12.1. A conduit box 18 or the like is mounted on the base plate in any conventional manner and the novel and improved insulation detecting type of protector device 20 of this invention is mounted on the conduit box to extend from the box to a location on the fixture where it will be subjected to conditions generally representative of fixture operating conditions. That is, the detector device is located so that if thermal insulation around the fixture 10 tends to block dissipation of heat by convection around the fixture, the thermal insulation will also tend to block dissipation of heat by convection from the protector device 20. The fixture 10 is mounted in a ceiling 22 with the lamp mounting means 16 located over a ceiling opening 22.1 and extending into a recessed location behind the ceiling as will be understood. The fixture is secured to the ceiling in any conventional manner. For example, the flanges 12.2 fit into corresponding openings in the ceiling and detent tabs 12.3 or the like bent out of the flanges secure the fixture base plate to the ceiling.

Figure 4:
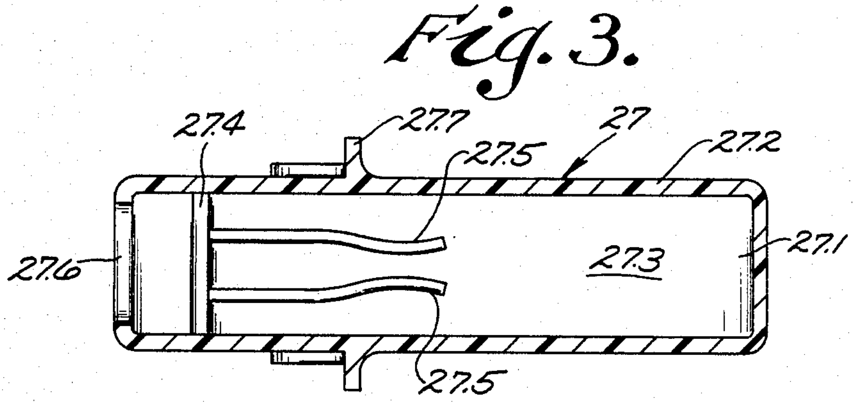
FIG. 4 is a plan view to enlarged scale of one part of the housing used in the protector device of this invention.
Figure 5:
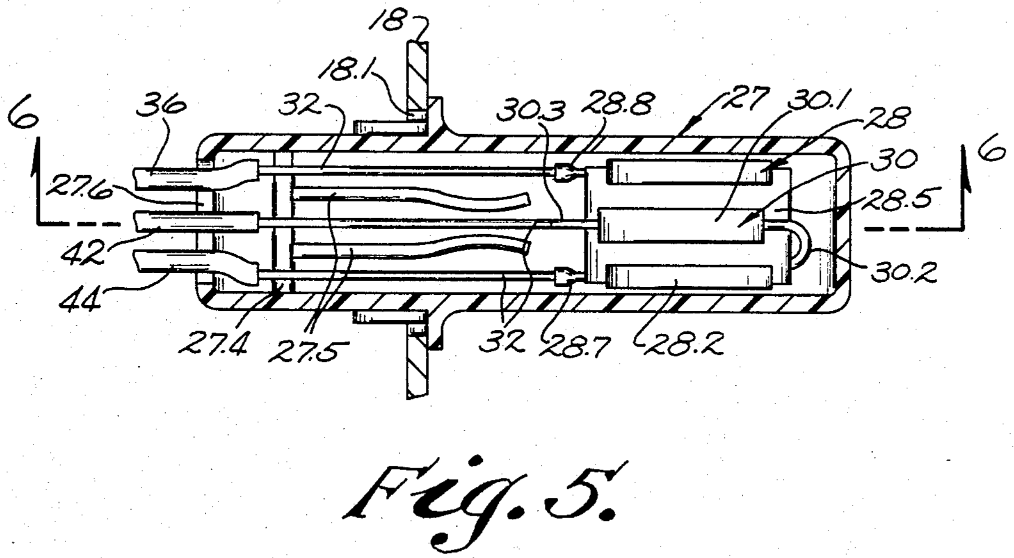
FIG. 5 is a section view to greatly enlarged scale along the longitudinal axis of the protector device of this invention as used in the lighting fixture of FIG. 1.
Figure 6:
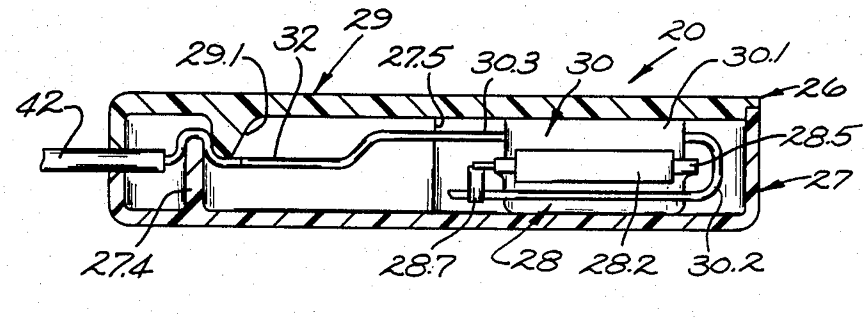
FIG. 6 is a section view along line 6—6 of FIG. 5.

In accordance with this invention as shown in FIGS. 4–6, the improved protector device of this invention comprises a housing 26 which is preferably of a generally tubular configuration open at one end and closed at an opposite end and which is preferably formed of a molded polyethylene or the like suitable for use at elevated temperatures. A thermally responsive electrical switch means 28 is mounted within the housing and an electrical resistance heater means 30 is also disposed in the housing in thermally coupled relation to the switch means as shown in FIG. 5. Electrical lead means from the switch and heater means then extend from the housing through the open housing end. Thermally conducting, electrically insulating potting materials may be provided in the housing to enhance dissipation of heat from the heater 30 through the housing 26.

Preferably for example, the housing 26 includes one part 27 as shown in FIG. 4 having a bottom 27.1, side walls 27.2 forming a chamber 27.3, a divider wall 27.4 standing up a short distance from the bottom adjacent one end of the chamber, a pair of barriers 27.5 standing up a relatively greater distance from the bottom and extending from the divider wall to separate the chamber into sections, and a groove 27.6 in one of the side walls at one end of the housing part. A flange 27.7 serves to locate the housing part in an opening 18.1 in the conduit box as shown in FIG. 5. An additional housing part 29 as shown in FIG. 6 is secured to the housing part 27 by ultrasonic fusion or the like to form the housing 26 and has three depending divider elements 29.1 (only one of which is shown) for purpose to be described below.

Figure 7:
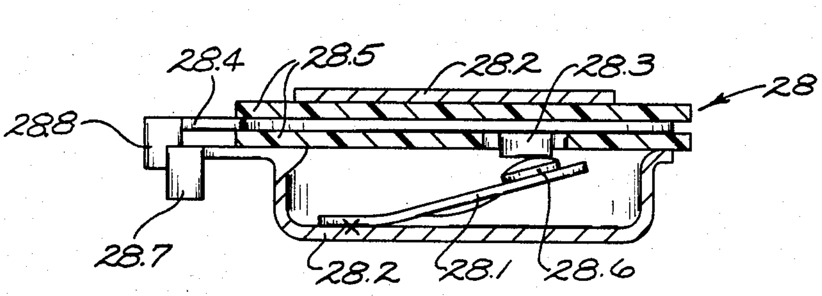
FIG. 7 is a section view to even larger scale along the longitudinal axis of a switch means used in the protector device of FIGS. 5 and 6.

Preferably, as shown in FIG. 7 the thermally responsive switch means 28 comprises a low cost, mass-producible switch unit such as is shown in U.S. Pat. No. 3,430,177 or the like. In that known switch, a thermally responsive bimetallic member 28.1 has one end secured in electrically conductive relation to the bottom of an open-ended electrically and thermally conductive metal can 28.2 and a fixed electrical contact 28.3 is secured to a metal cover 28.4 which is disposed over the open end of the can. The cover is secured and sealed in electrically-insulated relation to the can by means of an electrically insulating gasket 28.5. A movable electrical contact 28.6 is carried at the opposite end of the bimetallic member and is normally disposed in electrical engagement with the fixed contact 28.3 for closing a switch circuit between the switch can and cover. However, the bimetallic member is adapted to move in response to heating to a selected temperature for opening that circuit as will be understood. In a preferred embodiment, the bimetallic element is preferably actuatable for opening the circuit to deenergize the lamp 14 when the bimetallic element is heated to a temperature of about 120° C. plus or minus 5° C. Integral terminals 28.7 and 28.8 are provided on the can and cover respectively and the switch is fitted into the housing 26 to locate the switch in the housing. Alternately other conventional thermally responsive electrical switches can also be used in the device 20 according to this invention. As operation of the switch 28 is fully described in the above-noted patent, it is not further described herein and it will be understood that the switch is actuatable in response to heating to said selected temperature for opening the noted switch circuit, preferably with snap action. The switch is also preferably adapted to reclose the switch circuit, also with snap action, if the switch is subsequently cooled below a usually lower differential or reset temperature. Alternately the switch may be of a manually resettable type.

Preferably the electrical resistance heater means 30 is thermally coupled to the switch means 28 by being mounted on the switch cover 28.4. Preferably for example, the heater comprises a conventional carbon resistance heater 30.1 having heater terminals 30.3, 30.4 provided at opposite ends of the heater. One of the terminal 30.2 is then soldered to the switch can terminal 28.7 as indicated in FIGS. 5 and 6 to secure the heater to the switch means in electrically connected relation to the switch can. Preferably the heater is proportioned for selectively actuating the thermally responsive switch as herein after described when the heater is operated at a power level of not more than about one watt as applied voltage varies in the range from about 106 to 127 volts a.c. Alternately the electrical resistance heater means 30 can comprise a resistance wire heater or the like within the scope of this invention.

In accordance with this invention, the switch means 28 and heater means 30 are electrically connected to electrical circuitry such as to an electrical power source and to the lamp 14 by lead means which include thermal barrier elements 32 for restricting heat-transfer from the heater means out of the protector device 20 through the lead means so that only a relatively small proportion of the heat output of the heater means 30 is dissipated from the protector device 20 through the lead means. Preferably, each of such lead means includes two lead elements, a first element formed of a copper wire or the like having relatively high electrical and thermal conductivity and a second, thermal barrier element 32 formed of an electrically conductive metal alloy or the like which is characterized by relatively much lower thermal conductivity than the first element of the lead means. Preferably for example, a thermal barrier element 32 is welded to the terminal 30.3 on the heater 30. Similar thermal barrier elements 32 are provided with welded copper ends which are crimped in electrically conductive relation to the respective switch terminals 28.7 and 28.8. The thermal barrier elements are arranged so that they are electrically separated from each other by the housing barriers 27.5 as will be understood. Copper wire lead elements are then electrically connected to the thermal barrier elements 32 for connecting the switch and heater means in electrical circuits. That is, line lead wires 36, 38 are connected from a power source indicated at 40 in FIG. 3 and extend into the conduit box 18 to the protector switch and heater and to the lamp 14 as shown in FIG. 3. Additional copper lead wires 42 and 44 connect the heater 30 in parallel relation to the lamp 14 and the switch 28 in series relation to the lamp 14 as is diagrammatically shown in FIG. 3. A manually operable switch 46 for operating the lamp is preferably interposed in the line 36 as will be understood. In a preferred construction, the copper wire lead elements 38, 42 and 44 are soldered or otherwise electrically connected to respective barrier elements 32 and the copper wire lead elements for example are bent to be pressed down between the barriers 27.5 by the depending divider elements 29.1 on the housing part 29, to extend up to pass over the divider wall 27.4 on the housing part 27, and to be clamped into the groove 27.6 in the housing part 27 by a depending lip 29.2 provided on the other housing part when the housing parts 27 and 29 are secured together. In that way, the lead means to the switch and heater means are securely positioned in the housing to extend from the housing with excellent strain relief so that they do not tend to be easily pulled from the switch or heater means.

In accordance with this invention, the thermal barrier elements 32 are formed of electrically conductive stainless steels or chromium-nickel alloys or the like having relatively low thermal conductivity. Preferably for example, the barrier elements are formed of materials having nominal composition (by weight) as set forth in Table I below, the individual elements preferably being proportioned to have a thermal resistivity $R_T$(seconds/-centimeter/°C./Calorie) on the order of 10 or more for significantly retarding heat dissipation from the heater through the barrier elements.

TABLE I

| Alloy | Ni | Cu | Fe | Cr | Mo | Co | Others |
|---|---|---|---|---|---|---|---|
| Resistance alloy | 80 | | | 20 | | | |
| Inconel | 79 | | 7 | 13.5 | | | |
| Nichrome | 62 | | 22 | 15 | | | |
| Hastelloy B | 63 | | 5 | | 30 | | |
| Hastelloy A | 58 | | 18 | | 18 | | 2 Mn |
| Nimonic 80A | 67.5 | | 5 | 20 | | 2 | 2.25 Ti<br>1.25 Al<br>1 Mn<br>1 Si |

In that arrangement, closing of the switch 46 energizes the lamp 14 through the switch means 28 and also energizes the heater in parallel with the lamp. If the recessed mounting location of the fixture 10 is substantially free of surrounding thermal insulation so that heat generated by the lamp 14 is dissipated from the fixture at a suitable rate by convection around the fixture, the fixture does not overheat. In the same way, heat is dissipated from the protector device 20 (primarily by convection around the device housing, and accordingly the heater 30 does not heat the switch 28 to the actuating temperature of the switch and operation of the lamp 14 continues uninterrupted. However, if thermal insulation has been disposed around the fixture 10 so that the insulation excessively blocks dissipation of heat by convection from the fixture 10 and from the protector device 20, the heater 30 heats the switch 28 to its actuating temperature to interrupt lamp operation before the fixture 10 overheats and reaches an excessive fixture temperature. This can occur rapidly where the thermal insulation is relatively thick or may occur over a period of several hours. In either event, the temperature of the switch in the protector device 20 is related to the temperature of the fixture 10 for interrupting lamp operation before fixture overheating occurs. As indicated in FIG. 3, interruption of the lamp means 14 by operation of the switch 28 also deenergizes the heater 30 to allow the switch 28 to cool and to ultimately reenergize the lamp. In that way, the flashing intermittent lamp operation provides a safe indication of the need for correction of the fault thermal insulation condition. However other arrangements of the heater are also possible. The thermal barrier elements 32 and the protector device assure that most of the heat output of the heater 30 is dissipated from the protector device 20 other than through the lead means connecting the switch 28 and the heater 30 in electrical circuits. Accordingly, when heat dissipation by convection around the protector housing is blocked by the presence of excessive thermal insulation around the fixture, a substantial proportion of the output of the heater 30 is available for heating the switch to its actuating temperature. Therefore, the heater 30 need only be operated at a very low power level and will still have sufficient heating effect to assure prompt and reliable actuation of the switch 28 when required.

Most important, the protector device 20 is adapted to provide substantial tolerances such that the device will not cause nuisance interruptions of the lamp 14 or permit even temporary overheating of the fixture 10 if line voltage variations or variations in ambient temperature within ranges likely to be encountered cause variation in the heat output of the heater 30 or the like. In the arrangement of the protector device 20 as described, the output of the heater 30 can vary over a significant range without causing nuisance interruption of lamp operation and can still provide rapid and reliable actuation of the switch 28 to interrupt lamp operation if thermal insulation excessively blocks dissipation of heat from the fixture.

For example, if the fixture is disposed in a rectilinear test box for normal conditions formed of ½" thick plywood so that the fixture is mounted in the bottom of the box as in the ceiling previously described, so that the sides of the box are spaced ½" from sides of the fixture, and so that the box cover is located ½" over the top of the fixture, and if the fixture is proportioned to operate in that test box with no part of the fixture contacting the box being heated to a temperature of 90° C. for two hours or more and with no outer portion of the fixture heating to a temperature exceeding 160° C. as is typically required, the protector 20 is adapted to operate at a power level not greater than about one watt and to permit operation of the lamp means in the fixture without nuisance interruption of the lamp even though the applied heater voltage may vary in the range from 106 to 127 volts a.c. and ambient temperatures may vary in the range from about 12° to 40° C. On the other hand if the fixture is mounted in an alternate test box for abnormal conditions formed of the same materials where the box sides are spaced ½" from the sides of the fixture and if filling of the bottom of the box to a depth of 4" with thermal insulation of a type intended to be poured or blown into the box having a rating of 3.75R per inch at a density of 2.0 to 2.5 pounds per cubic foot causes any portion of the fixture in contact with the thermal insulation to increase to a temperature of 90° C. for a period of two hours, the protector 20 is adapted to interrupt energizing of the lamp means in the fixture as is typically required without exceeding an outer protector temperature of 160° C. even though the applied heater voltage may vary in the range from 106 to 127 volts a.c. and ambient temperature may vary in the range from about 12° to 40° C.

Figure 8:
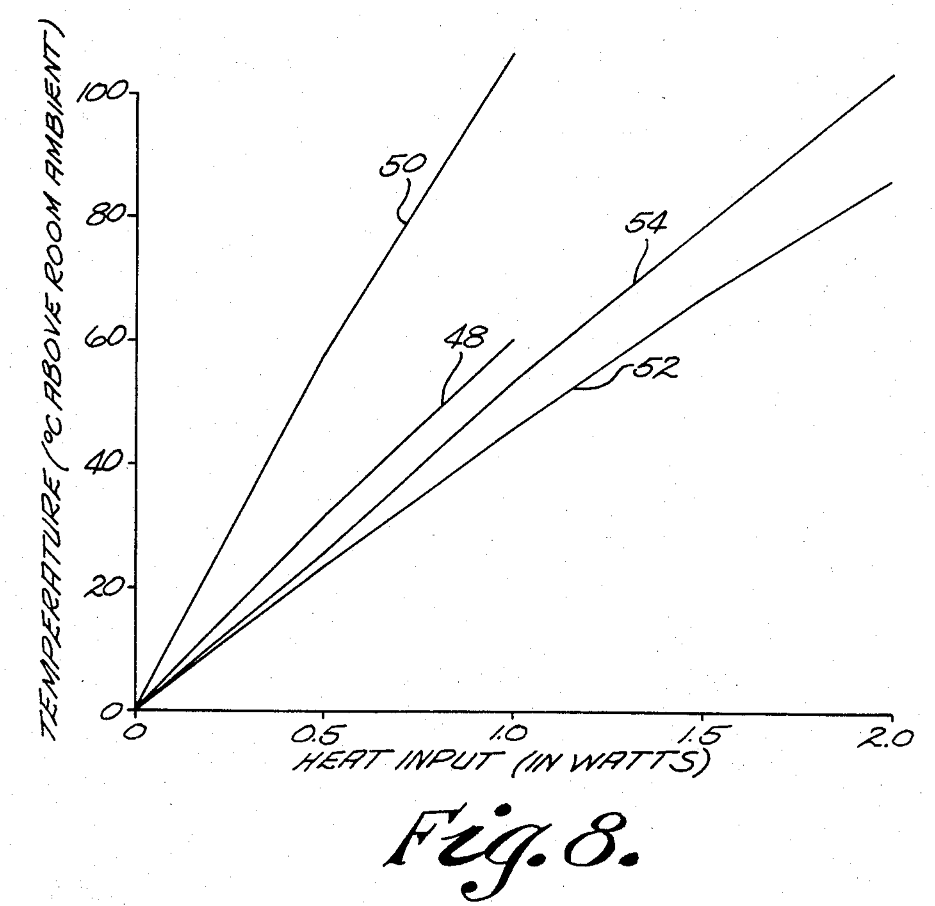
FIG. 8 is a graph illustrating operating characteristics of the fixture and protector device of this invention.

For example, referring to FIG. 5, when the protector device 20 of this invention is operated with a heater power level of 1.0 watts while the device is disposed in such a normal test box at an ambient temperature of 25° C., the switch 28 and the protector device is heated to a temperature of 60° C. as indicated by curve 48 in FIG. 8. However, when the heater is operated at the same power level while the protector device is covered with a thickness of 4" of the noted thermal insulation in the abnormal test conditions as above described, the switch temperature rapidly rises to a temperature of over 100° C. for example as indicated by curve 50 for operating the switch 28 but maintaining outer protector temperature at a level substantially below 160° C. In that arrangement, where the device 20 is used to prevent excessive heating of the recessed fixture 10 above a temperature of about 90° C. for a selected period of about two hours, the device 20 provides a substantial tolerance range of about 30° C., thereby to avoid risk of fixture overheating while also avoiding nuisance interruption of the fixture lamp. With such tolerance, the protector device 20 provides safe and reliable fixture operation even during variations in line voltage and ambient temperature within ranges likely to be encountered. On the other hand, when a known prior art insulation detecting device in commercial use is operated at the same power level in the noted normal test box and then under thermal insulation in the noted abnormal test box, the prior art device achieves only a change of about 10° C. or less as indicated by curves 52 and 54 respectively in FIG. 8. Accordingly the prior art device has very little tolerance and is likely to be subject to nuisance interruption of lamp operation during line voltage variation and the like. Most important, even when the power level of the prior art protector device is doubled as is required for reaching a desired 90° C. fixture protection level, the prior art device still provides a very small range of tolerance between the nuisance interruption level and the level at which it may fail to provide proper protection against fixture overheating.

It should be understood that although particular embodiments of the recessed lighting fixture and protector device of this invention have been described above by way of illustrating the invention, this invention includes all modifications and equivalents of the disclosed embodiments falling within the scope of the appended claims.

I claim:

1. A recessed electrical lighting fixture comprising lamp means of selected rating, means adapted to engage a support for mounting the fixture on the support, means for energizing the lamp means, and an insulation-detecting thermally responsive protector device comprising thermally responsive switch means actuatable in response to heating to a selected switch actuation temperature for interrupting energizing of the lamp means, the switch means being thermally associated with the means for mounting the fixture, and electrical resistance heater means thermally coupled to the switch means for actuating the switch means in a selected period of time if selected thermal insulation conditions should occur around the fixture and block dissipation of heat from the fixture to permit temperature of any portion of the mounting means to be in contact with the support to increase to 90° C., the heater and thermal responsive switch means having electrically conductive lead means extending therefrom to electrically connect the heater and switch means to electrical circuitry for energizing the heater means at a selected voltage and for regulating energizing of the lamp means, characterized in that the heater means is proportioned to operate at a power level not greater than about 1 watt and to permit a maximum outer temperature of not more than 160° C. at a location exposed to said thermal insulation condition during interruption of energizing of said lamp means, the switch means has an actuating means adapted to move at a temperature of 120° C. plus or minus 5° C. for actuating the switch means, and, said electrical lead means are provided with selected, relatively low heat-transfer properties and are arranged to limit heat transfer from the heater means away from the heater and switch means through said lead means to a minor proportion of the heat generated by the heater means to assure desired interruption of lamp energizing when said selected thermal insulation conditions occur while avoiding nuisance interruptions of said lamp energizing during variation of said applied heater voltage in the range of about 107 to 127 volts a.c. and during variation in ambient temperature in the range from 12° to 40° C.

2. An electrical lighting fixture as set forth in claim 1 further characterized in that the protector device has a housing means, and the thermally responsive switch means is disposed in the housing means to be actuatable in response to heating to a selected switch actuation temperature.

3. An electrical lighting fixture as set forth in claim 2 further characterized in that each of said electrically conductive lead means connected to the heater means and to said thermally responsive switch means incorporates a thermal barrier element of relatively high thermal resistivity for retarding heater-transfer from the housing means through said lead means.

4. A fixture as set forth in claim 3 further characterized in that the electrically conductive lead means each incorporate a first element for a first electrically conductive material having a relatively high electrical conductivity and a first selected thermal conductivity and a second element of a second electrically conductive material having relatively much lower thermal conductivity than said first element, the first and second elements in each of the said lead means being connected in series relation to each other and each of said respective lead means.

5. A fixture as set forth in claim 4 further characterized in that said thermal barrier elements of the lead means have a thermal resistance $R_T$ of at least 10 seconds/centimeter/°C./Calorie.

6. A fixture as set forth in claim 5 further characterized in that the housing means enclosing said switch means and enclosing the heater means in thermally coupled relation to the switch means has an opening therein, said lead means extend from the housing through said openings for electrically connecting the switch and heater means to said electrical circuitry, and sealing means are disposed in said opening around portions of the lead means for sealing the housing means.

7. A fixture as set forth in claim 6 and further characterized in that said thermal barrier elements of the lead means are formed of an electrically conductive material of relatively low thermal conductivity selected from the group consisting of stainless steels and chromium-nickel alloys having a thermal resistance $R_T$ of at least 10 seconds/centimeter/°C./Calorie.

* * * * *